United States Patent
Puetz et al.

(10) Patent No.: US 10,690,941 B2
(45) Date of Patent: Jun. 23, 2020

(54) LENS ARRANGEMENT, IN PARTICULAR A SPECTACLE GLASS ARRANGEMENT AND METHOD FOR PRODUCING A LENS ARRANGEMENT

(71) Applicant: tooz technologies GmbH, Aalen (DE)

(72) Inventors: Joerg Puetz, Aalen (DE); Jens Prochnau, Oberkochen (DE); Ralf Meschenmoser, Essingen (DE)

(73) Assignee: tooz technologies GmbH, Aalen (DE)

( * ) Notice: Subject to any disclaimer, the term of this patent is extended or adjusted under 35 U.S.C. 154(b) by 112 days.

(21) Appl. No.: 15/758,336

(22) PCT Filed: Sep. 7, 2016

(86) PCT No.: PCT/EP2016/071030
§ 371 (c)(1),
(2) Date: Mar. 7, 2018

(87) PCT Pub. No.: WO2017/042192
PCT Pub. Date: Mar. 16, 2017

(65) Prior Publication Data
US 2018/0259792 A1 Sep. 13, 2018

(30) Foreign Application Priority Data
Sep. 7, 2015 (DE) .......................... 10 2015 114 990

(51) Int. Cl.
*G02B 3/08* (2006.01)
*G02C 7/08* (2006.01)
*G02B 27/01* (2006.01)

(52) U.S. Cl.
CPC .............. *G02C 7/086* (2013.01); *G02B 3/08* (2013.01); *G02B 27/017* (2013.01); *G02B 2027/0178* (2013.01); *G02C 2202/20* (2013.01)

(58) Field of Classification Search
CPC .......................... G02B 2027/0178; G02B 3/08
(Continued)

(56) References Cited

U.S. PATENT DOCUMENTS 5,161,057 A * 11/1992 Johnson ................... G02B 3/08
359/566
9,835,866 B2 12/2017 Widulle et al.
(Continued)

FOREIGN PATENT DOCUMENTS

CN 105579887 A 5/2016
DE 102013219626 A1 4/2015
(Continued)

OTHER PUBLICATIONS

Examination Report including Search Report to the corresponding Chinese Patent Application rendered by the China National Intellectual Property Administration dated Apr. 8, 2019, 25 pages (including English translation).
(Continued)

*Primary Examiner* — Hung X Dang
(74) *Attorney, Agent, or Firm* — Skaar Ulbrich Macari, P.A.

(57) ABSTRACT

Disclosed is a lens arrangement, in particular a spectacle lens arrangement, having a base lens element, wherein the base lens element has a first surface and wherein the first surface has a first optically effective region, wherein the first surface has an elongate recess and wherein the elongate recess extends adjacent to the first optically effective region and at least partly encompasses the first optically effective region. Moreover, methods for producing a lens arrangement are disclosed.

37 Claims, 12 Drawing Sheets

(58) Field of Classification Search
USPC .................. 351/159.01, 159.73; 359/566
See application file for complete search history.

(56) References Cited

U.S. PATENT DOCUMENTS

2012/0057253 A1    3/2012   Takagi et al.
2012/0120493 A1    5/2012   Simmonds et al.

FOREIGN PATENT DOCUMENTS

| DE | 102014207494 A1 | 10/2015 |
| EP | 1385023 A1 | 1/2004 |
| EP | 2422232 B1 | 2/2012 |
| EP | 2431790 A1 | 3/2012 |
| EP | 2653910 A1 | 10/2013 |
| WO | 2015044305 A1 | 4/2015 |

OTHER PUBLICATIONS

International Preliminary Report on Patentability rendered by the International Bureau of WIPO for PCT/EP2016/071030 dated Mar. 22, 2018, 9 pages.
Norm DIN EN ISO 13666:1998, Nov. 1998, 53 pages.
Examination Report to foreign priority application (German Patent Application No. 10 2015 114 990.7) rendered by The German Patent and Trademark Office dated May 9, 2016, 12 pages (including English translation).

* cited by examiner

LENS ARRANGEMENT, IN PARTICULAR A SPECTACLE GLASS ARRANGEMENT AND METHOD FOR PRODUCING A LENS ARRANGEMENT

PRIORITY

This application claims the priority of German patent application DE 10 2015 114 990.7, filed Sep. 7, 2015, which is hereby incorporated herein by reference in its entirety.

FIELD

The present invention relates to a lens arrangement, in particular a spectacle lens arrangement, having a base lens element, wherein the base lens element has a first surface and wherein the first surface has a first optically effective region. Furthermore, the present invention relates to a method for producing a lens arrangement.

In particular, such a lens arrangement, in particular such a spectacle lens arrangement, can be utilized to be used for a display apparatus that can be placed on the head of a user and that produces an image. In particular, the present invention therefore also relates to a display apparatus having such a spectacle lens arrangement.

BACKGROUND

Spectacle lens arrangements have already been proposed in the prior art. As a rule, such spectacle lenses have an input coupling portion in an edge region of the spectacle lens arrangement. Moreover, provision is made of an output coupling portion in a central region or lenticular region of the spectacle lens arrangement. Then, the spectacle lens is suitable for guiding a light beam of a produced image, which is coupled into the spectacle lens arrangement by way of the input coupling portion, in the spectacle lens arrangement up to the output coupling portion and for coupling said light beam out of the spectacle lens by way of the output coupling portion. As a rule, internal total-internal reflection is used for guidance between the input coupling portion and the output coupling portion. A Fresnel surface structure may be provided for providing the output coupling portion, for example.

For instance, the document DE 10 2013 219 626 A1 shows an example of such a lens arrangement. This document discloses a spectacle lens for a display apparatus that can be placed onto the head of a user and that produces an image, having a spectacle lens body having a front side and a rear side, wherein the front side and/or the rear side is/are curved and the spectacle lens body has at least one first and one second partial body, the interfaces of which facing one another being in direct contact, and having, as seen in a plan view of the spectacle lens, an input coupling portion in an edge region of the spectacle lens and an output coupling portion in a central region of the spectacle lens, wherein the spectacle lens is suitable for guiding light beams of pixels of the produced image, which are coupled into the spectacle lens by way of the input coupling portion of the spectacle lens, in the spectacle lens up to the output coupling portion and to couple said light beams out of the spectacle lens by way of the output coupling portion, wherein provision is made in the spectacle lens body of a plane first reflection area and a plane second reflection area spaced apart from the first reflection area, said reflection areas each extending in a direction from the input coupling portion to the output coupling portion and each being spaced apart from the front and rear side of the spectacle lens body, wherein the light beams are guided in the direction from the input coupling portion to the output coupling portion by way of reflections at the two reflection areas and wherein at least one of the first and second reflection area is provided in the first or second partial body and offset from the interface of the corresponding partial body in a direction from the first to the second partial body.

Optical elements should often be joined in such spectacle lens arrangements. Here, it may be the case that a plurality of optical elements have to be joined, for example a plurality of lens elements to one another or a film, shell or a further optical element on the lens element. When the optical elements are joined thus using an adhesive, the conditions in an edge region are often decisive for the success of the adhesion process. If too much adhesive is provided in an adhesion gap between the elements to be joined, the adhesive emerges from the sides. If too little adhesive is provided, the edge regions of the joining portion are not filled in an ideal manner. This may be accompanied by significant impairments of subsequent processes if there is no uniform connection and support of the optical elements over the joining area. When joining, no contaminations may arise during the joining process. Moreover, the appearance of cavities or edge regions that are not completely wetted constitutes an obstacle for subsequent wet treatments. Under certain circumstances, subsequent processing steps may even become impossible. The amount of adhesive to be applied depends on the gap width, i.e. the distance between the joining elements, the geometric tolerances of the joining elements and also the accuracy of the application of adhesive. On account of this multiplicity of parameters, the exact application of the required amount of adhesive is connected with difficulties.

Moreover, there is within the spectacle lens arrangement an output coupling portion, as described above, which may be embodied as a Fresnel surface structure. The clear spaces necessarily arising when forming the Fresnel surface structure, which are referred to below as incision regions, should be filled with an optically neutral material in order to avoid unwanted optical effects such as image distortions, for example. Such a process may occur under reduced pressure or under positive pressure; it may also occur in different gas atmospheres, such as in an inert gas, for instance nitrogen, or another protective gas, for example. On account of the form, the small dimensions and the geometry of the Fresnel sloped elevations and the incision regions situated therebetween, air inclusions may form during filling and/or the filler material, which may also be an adhesive, for example, may not flow uniformly into the incision regions.

SUMMARY

It is therefore an object of the present invention to provide a lens arrangement, in particular a spectacle lens arrangement, or a display apparatus having such a spectacle lens arrangement or a method for producing a lens arrangement, wherein the above-described disadvantages are avoided.

The disclosure includes a lens arrangement, in particular a spectacle lens arrangement, having a base lens element, wherein the base lens element has a first surface, and wherein the first surface has a first optically effective region, wherein the first surface has an elongate recess and wherein the elongate recess at least partly encompasses the first optically effective region. In particular, the elongate recess may in the process extend adjacent to the first optically effective region, for example.

Here, the "optically effective region" should be understood to mean the region of the lens arrangement or of the spectacle lens arrangement which provides an intended optical effect. By way of example, the optically effective region may be a central region or a lenticular region. In respect of the term "lenticular region", reference is also made to the DIN EN ISO 13666:1998 standard, paragraph 13.2. There, the term "lenticular portion" is defined, according to which this is that portion of a lenticular lens which has the prescribed power. This lenticular portion or the lenticular region is at least partly encompassed by an edge region or carrying edge. Within the scope of the present invention, the "lenticular region" or "central region" may also have zero power. The lenticular region or central region is that region of the lens arrangement provided to be looked through by a wearer of spectacles having the lens arrangement. It may be the optically effective region or else a Fresnel surface region, for example. The latter may have a desired optical effect as an output coupling portion for coupling out radiation transferred within the spectacle lens arrangement by way of total-internal reflection. Consequently, the optically effective region is embodied in such a way that it provides a predefined optical effect of the base lens element in the lens arrangement.

In particular, the lens arrangement or the spectacle lens arrangement may be an uncut spectacle lens or an edged spectacle lens, i.e. a spectacle lens before or after edging; cf., in particular, also paragraphs 8.4.7 and 8.4.8 of the DIN EN ISO 13666:1998 standard.

The disclosure also includes a spectacle lens arrangement, having a base lens element, wherein the base lens element has a surface, wherein the surface has a Fresnel surface region with a Fresnel surface structure, wherein the Fresnel surface region has a plurality of Fresnel sloped elevations with incision regions lying therebetween for providing the Fresnel surface structure, wherein the surface has an elongate recess, wherein the elongate recess extends adjacent to the Fresnel surface structure and connects the incision regions to one another, in particular wherein a depth of the recess into the surface is greater than a depth of the incision regions into the surface or equals a depth of the incision regions into the surface.

Consequently, this lens arrangement distinguishes itself by virtue of, specifically, an optically effective region being formed by a Fresnel surface region with a Fresnel surface structure. Then, the elongate recess at least partly encompasses the Fresnel surface structure and connects the incision regions thereof.

Consequently, the elongate recess renders it possible, firstly, to apply an excessive amount of adhesive to the base lens element in the case of joining two optical elements of the lens arrangement. To this end, the elongate recess is able to take up the excess applied adhesive. In this respect, slightly too much adhesive may be applied in a targeted manner in the case of joining by means of an adhesive in order to be "on the safe side" in respect of the application of adhesive. In certain circumstances, the application of too little adhesive may be significantly more critical since an applied film or an optical element possibly has too little or no stability in the edge region. By way of example, this may greatly increase the probability of a coating applied to the film being easily damaged or chipped. The targeted application of slightly too much adhesive at least ensures the application of adhesive over the entire region to be joined. Furthermore, the reservoir of adhesive in the elongate recess formed thus is able to prevent air from entering the joining gap in the case of a retreat of the adhesive, for example as a consequence of shrinkage or thermal expansion. Thus, the excess applied adhesive may form a compensation reservoir. Moreover, air inclusions or the like occurring in the elongate recess may be avoided by the excessively applied adhesive by way of a suitable configuration of the elongate recess, which will be explained below. Thus, an adhesive layer may have a neutral effect in respect of its optical properties. However, in principle, the elongate recess should be designed in such a way that it is filled as completely as possible with adhesive. Consequently, no gaps or undercuts should occur.

It is possible, even in the case of the configuration of the optically effective region as a Fresnel surface region, to obtain similar advantages with the elongate recess. Since it connects the incision regions to one another, individual filling of the incision regions is avoided or becomes superfluous. Once again, the occurrence of air inclusions within the incision regions, in particular at the start and at the end of the Fresnel structures, can be avoided by completely filling the incision regions such that a filler material or an adhesive enters into the elongate recess from the incision regions. The air is pushed out into the elongate recess while filling the adhesive. Moreover, connecting all incision regions by means of the elongate recess renders an adhesive compensation between the incision regions possible, and so the exact filling quantity of an individual incision region is no longer decisive. Configuring the depth of the elongate recess into the surface of the base lens element to be greater than a depth or equal to a depth of the incision regions into the surface of the base lens element moreover ensures that all air incisions, even at a base of an incision region, are in fact able to be pressed out into the recess.

Consequently, the collection region provided by the elongate recess allows compensation of variations in the amount of adhesive and acceleration of the filling process. The variations caused by certain tolerances in a gap thickness, component tolerances or the amount of adhesive applied are thus compensated. Possible adhesives for lens arrangements may be acrylates, polyurethanes, epoxy thiols, epoxy amines or silicones, for example.

Consequently, the adhesive or the filler material being able to flow to the base of the incision regions and the edges of the incision regions also being sufficiently well filled is ensured when the optically effective region is configured as a Fresnel surface region. When the filler material or the adhesive is applied, the adhesive pushes the air along the Fresnel surface structure into the elongate recess. Provision can be made for the regions to be wet with the adhesive or the filler material to be activated in advance, for example by plasma, so that there can be better wetting by means of the filler material or the adhesive. Ultimately, the wetting behavior and flow behavior of the adhesive can be adapted and improved by adapting the viscosity of the adhesive, by the addition of appropriate additives or flow additives and by adapting the temperature of the adhesive during the application or else the temperature of the component during the application. Moreover, provision can be made for the elongate recess to continue to be filled with the filler material after the Fresnel surface region has been filled. In this way it is possible also, for example, to design a transition of the Fresnel surface region to a surrounding region of a lens arrangement in such a way that the transition is no longer recognizable by a user of the lens arrangement and no optical distortion occurs. By way of example, this may be provided by virtue of using a material for the purposes of filling which has a refractive index substantially corresponding to that of the material of the lens arrangement. Radii in the elongate recess facilitate a clean fill of the complete structure with an adhesive and reduce the risk of air inclusions.

Moreover, the disclosure includes a method for producing a lens arrangement, said method including the following steps: providing a base lens element with a first surface, wherein the first surface has a lenticular region and an elongate recess and wherein the elongate recess extends adjacent to the lenticular region and at least partly encompasses the lenticular region; applying a liquid adhesive onto the lenticular region such that the adhesive completely covers the lenticular region and extends into the elongate recess and/or applying the liquid adhesive onto a further optical element, in particular a shell or film, which completely covers the lenticular region; applying the further optical element, in particular the shell or the film, which completely covers the lenticular region onto the base lens element; and curing the adhesive.

The disclosure still further includes a method for producing a lens arrangement, including the following steps: providing a base lens element with a surface, wherein the surface has a Fresnel surface region with a Fresnel surface structure, wherein the Fresnel surface region has a plurality of Fresnel sloped elevations with incision regions lying therebetween for providing the Fresnel surface structure, wherein the first surface has an elongate recess, wherein the elongate recess extends adjacent to the Fresnel surface structure and connects the incision regions to one another, in particular wherein a depth of the recess into the surface is greater than a depth of the incision regions or equals a depth of the incision regions into the surface; filling the incision regions with a liquid filler material such that the filler material completely fills the incision regions and extends into the elongate recess; curing the filler material.

The disclosure additionally includes a display apparatus having at least one lens arrangement according to the first aspect, or one of its configurations, or according to the second aspect, or one of its configurations.

In a configuration of the lens arrangement, provision can be made for the elongate recess to extend adjacent to the first optically effective region.

By way of example, this may be provided if the optically effective region is embodied as a Fresnel surface region. This may also be provided if the optically effective region is embodied as a lenticular region or central region, but this is not mandatory. By way of example, the elongate recess also may be provided adjacent to the optically effective region only in portions. Also, a transition region may be present between the elongate recess and the optically effective region. Then, an adhesive passes thereover when entering the elongate recess from the optically effective region.

In a configuration of the lens arrangement, provision can be made for the base lens element to have a front surface, a back surface, and an edge area, wherein the first surface is the front surface or the back surface of the base lens element.

In the present lens arrangement or spectacle lens arrangement, the front surface of the base lens element is the side of the lens element facing away from the user. Accordingly, the back surface is the side of the lens element facing the user. The use is effectuated pursuant to the DIN EN ISO 13666:1998 standard, paragraph 5.8: "front surface". According thereto, the front surface is the area in the spectacles facing away from the eye when used as intended. Accordingly, what applies to the back surface according to paragraph 5.9 is that it is the side in the spectacles facing the eye when used as intended.

Accordingly, the edge face is the face connecting these surfaces to which, ultimately, the frame of the spectacles is conventionally attached. Consequently, the surface is the front surface or the back surface of the base lens element, which provide the desired optical effect. If the optically effective region is configured as a lenticular region, this may be a prescribed power, in particular.

In a further configuration of the lens arrangement, provision can be made for the base lens element to have an integral embodiment.

By way of example, the base lens element may be formed by casting and appropriate post-processing, for example by grinding and/or polishing and/or milling. Use can also be made of an injection molding method and/or molding against a shell mold. However, in principle, this may also be a multi-part base lens element.

In a further configuration of the lens arrangement, provision can be made for the elongate recess to completely encompass the optically effective region.

Particularly when configuring the optically effective region as a lenticular region, provision can be made for the elongate recess to encompass said lenticular region completely, i.e. over the whole circumference. However, this is not mandatory. By way of example, provision may also be made for the elongate recess to encompass the lenticular region over 180° or more than 180° or more than 270°.

In a further configuration of the lens arrangement, provision can be made for the elongate recess to have a constant cross-sectional profile transversely to its longitudinal extent.

In this way, the elongate recess can be provided particularly easily, for example by way of a milling process. However, a production by means of casting or injection molding or any other suitable production type is also possible. Then, the flow behavior of an adhesive or a filler material in an elongate recess is also uniform over its longitudinal extent.

In a further configuration of the lens arrangement, provision can be made for the elongate recess to have a cross-sectional profile that varies along its longitudinal extent transversely to its longitudinal extent.

In this way, it is possible, for example, to match the cross-sectional profile to an amount of adhesive to be received. Since the optically effective region need not necessarily have a circular configuration, an amount of excess adhesive may vary over a circumference of the optically effective region. This may be compensated by a changing cross-sectional profile.

In a further configuration of the lens arrangement, provision can be made for a circumferential contour of the optically effective region to be circular.

This may be the case, particularly when configuring the optically effective region of a lenticular region or central region. However, the circumferential contour may also merely be a portion of a circle. This may be the case, for example, if a side of the base lens element has a flattened embodiment.

In a further configuration of the lens arrangement, provision can be made for a circumferential contour of the optically effective region to be rectangular.

In particular, this may be provided if the optically effective region is configured as a Fresnel surface region. Then, the advantage of the elongate recess being able to extend precisely along at least one side of the rectangle may emerge therefrom.

In a further configuration of the lens arrangement, provision can be made for the first optically effective region to be a lenticular region of the base lens element, in particular wherein the first optically effective region is a spherical area, an aspherical area or a cylindrical area.

As already explained above, this lenticular region or central region may implement the desired prescription for a user of the lens arrangement or spectacle lens arrangement. By way of example, this may be implemented by way of a spherical, aspherical or cylindrical area in the case of a second-order correction. Moreover, these can easily be provided by means of a machining treatment. However, as explained above, casting or injection molding or any other suitable production type is also possible.

In a further configuration of the lens arrangement, provision can be made for the first optically effective region to be a Fresnel surface region with a Fresnel surface structure.

As likewise already described above, this allows the provision of, for example, an output coupling portion or an input coupling portion in the lens arrangement with the aid of a base lens element. Then, in accordance with its slopes, the Fresnel surface region is embodied in such a way that a desired beam deflection about a certain angle is effectuated, and so the radiation is coupled into, or coupled from, the total-internal reflection.

In a further configuration of the lens arrangement, provision can be made for the Fresnel surface region to have a plurality of Fresnel sloped elevations with incision regions lying therebetween, wherein the Fresnel sloped elevations are coated.

By way of example, provision can be made for the Fresnel sloped elevations to be coated in order to obtain a desired degree of reflection. Thus, the Fresnel sloped elevations may be provided with a reflection coating, for example.

In a further configuration of the lens arrangement, provision can be made for a circumferential contour of the first optically effective region to be rectangular, wherein the elongate recess encompasses the optically effective region on only three sides of the rectangular circumferential contour.

In this way, the elongate recess is used particularly advantageously. Particularly when embodying the optically effective region as a Fresnel surface region, an elongate recess may be arranged in such a way that the incision regions between the flank regions of the Fresnel surface structure are connected at their two open ends by way of the elongate recess. By also arranging the elongate recess at the third side, the portions of the elongate recess connecting the incision regions are connected to one another in turn. Thus, the level of the filler material or of the adhesive can be compensated over the entire elongate recess and the Fresnel surface region and the air can be completely displaced.

In a further configuration of the lens arrangement, provision can be made for the Fresnel surface region to have a plurality of Fresnel sloped elevations with incision regions lying therebetween, wherein a depth of the elongate recess is greater than a depth of the incision regions or equals a depth of the incision regions.

This ensures that it is possible to avoid air inclusions at a base of an incision region since the air can be pressed, from there, to the outside into the elongate recess when a filler material is applied into the incision regions.

In a further configuration, provision can be made for the elongate recess to have a cross-sectional profile transversely to its longitudinal extent, wherein a minimum radius of the cross-sectional profile is greater than or equal to 0.05 mm. In particular, the minimum radius may be greater than or equal to 0.1 mm, 0.15 mm or 0.2 mm.

This ensures that the cross-sectional profile of the elongate recess is completely filled and the occurrence of air inclusions is avoided.

In a further configuration of the lens arrangement, provision can be made for the Fresnel surface region to be covered by a filler material portion, wherein the filler material portion extends into the elongate recess.

What is ensured in a lens arrangement embodied thus is that the Fresnel surface region is completely covered by the filler material portion and that more filler material than would be required for purely filling the Fresnel surface region was introduced in a targeted manner during the application of the filler material such that some of the filler material portion extends into the elongate recess. Moreover, this ensures that possible air inclusions in the Fresnel surface region are pressed out by the filler material. Consequently, the filler material portion is the cured filler material or the cured adhesive.

In a further configuration of the lens arrangement, provision can be made for the base lens element to be formed from a base lens material, wherein the filler material portion is formed from a filler material that differs from the base lens material and wherein the refractive index of the base lens material and the refractive index of the filler material are identical at the same reference wavelength. Here, slight deviations within the usual tolerances, for example in a region of the refractive index of 0.001, should still be considered to be identical.

By way of example, 546.074 nm, i.e. the e-line, can be used as reference wavelength. By way of example, the material Mitsui MR-8 with a refractive index of $n_e = 1.60$ can be used here together with a filler material or an adhesive made of an epoxy thiol which likewise has such a refractive index $n_e$ of 1.60.

In a further configuration of the lens arrangement, provision can be made for the lenticular region to be covered by a further optical element, in particular a shell or a film, wherein the further optical element is attached to the lenticular region by means of an adhesive portion and wherein the adhesive portion extends beyond the lenticular region into the elongate recess.

Such a further optical element, in particular a shell or film, may be applied, for example in order to obtain a further optical power component. It may also serve to cover or protect the lens arrangement.

If the adhesive portion extends beyond the lenticular region into the elongate recess, the film being supported in the entirety thereof by the adhesive portion is ensured. The film does not project beyond the adhesive portion, and so it cannot be damaged at its edge regions and does not have cavities or undercuts.

In a further configuration of the lens arrangement, provision can be made for the adhesive portion to completely fill the elongate recess.

Consequently, provision can be made for the elongate recess which at least partly surrounds the lenticular region to be filled in the entirety thereof in a targeted manner; this may be advantageous, particularly in the case of a subsequent wet treatment, in particular since no liquid remains may occur in the elongate recess.

In a further configuration of the lens arrangement, provision can be made for the elongate recess to be a first elongate recess, wherein the first surface moreover has a second elongate recess and wherein the second elongate recess extends adjacent to the first optically effective region, opposite to the first elongate recess.

In particular, this may be provided if the optically effective region is embodied as a Fresnel surface region with a rectangular contour. Then, an elongate recess may be embodied on both sides of the Fresnel flank region and the incision regions. Then, the elongate recesses are arranged at the open ends of the incision regions.

In a further configuration of the lens arrangement, provision can be made for a second optically effective region to be arranged in the first optically effective region, wherein the first optically effective region is a lenticular region of the base lens element and wherein the second optically effective region is a Fresnel surface region with a Fresnel surface structure and wherein both an elongate recess in each case extends adjoining the second optically effective region and at least partly encompasses the respective optically effective region.

Consequently, a Fresnel surface region may be arranged in the lenticular region.

Consequently, provision can be made cumulatively for the lenticular region to be at least partly encompassed by an elongate recess. Moreover, the Fresnel surface structure arranged in the lenticular region may also be at least partly encompassed by a further elongate recess. The advantages described above then emerge for both applications of the optically effective region.

In a further configuration, provision can be made for the Fresnel surface region to be covered by a filler material portion, wherein a surface of the filler material portion in a surface of the lenticular region merge into one another in a continuous fashion.

In this way, the filler material portion, after it is cured, may serve to provide the surface of the lenticular region in a continuous fashion. By way of example, the continuous transition may be provided by grinding and/or polishing and/or milling. Casting, injection molding and/or molding against a shell mold are also possible. In particular, this allows an optical power of the lenticular region to be provided over the entire lenticular region on account of the optically "neutral" filler material, i.e. filler material embodied with the same refractive index. Here, "continuous" should be understood to mean a continuously differentiable surface profile. Expressed differently, there is no kink at the transition.

In a further configuration of the lens arrangement, too, provision can be made for the lenticular region to be covered by a further optical element, in particular a shell or a film, wherein the further optical element is attached to the lenticular region by means of an adhesive portion.

Consequently, the lenticular region can be furnished with the elongate recess and a Fresnel surface region can be provided in the lenticular region, which is covered by means of the filler material and surrounded by a further elongate recess. Here, provision can be made, furthermore, for the lenticular region and hence also the Fresnel surface region to be covered by a further optical element, in particular a film. More precisely, the filler material portion applied to the Fresnel surface region is then, by means of the further optical element, covered by the further optical element.

In a further configuration of the method for producing a lens arrangement, provision can be made for there to be a further step of filling the elongate recess with the adhesive following the step of applying the liquid adhesive onto the lenticular region.

In this way, the method according to certain aspects can be developed, in a targeted manner, in such a way that, as described above, the elongate recess around the lenticular region is completely covered with adhesive; this is advantageous in the case of subsequent wet treatments, in particular, on account of the completely filled elongate recess.

In a configuration of the method according to certain aspects, too, provision can be made for the elongate recess to extend adjacent to the first optically effective region.

By way of example, the elongate recess may be provided adjacent to the optically effective region only in portions. Also, a transition region may be present between the elongate recess and the optically effective region. Then, an adhesive passes thereover when entering the elongate recess from the optically effective region.

In the method according to certain aspects, too, provision can be made for the elongate recess to be filled in the entirety thereof with the filler material after the filler material has cured. In particular, this may be carried out in order to provide a continuous surface transition between the Fresnel surface region and a likewise adjacent lenticular region. In this way, it is possible to avoid jumps in the optical power, for example.

In a further configuration of the method according to certain aspects, provision can be made for, moreover, a step of grinding and/or polishing and/or milling of the filler material to be carried out such that a surface of the filler material and a surface of the lenticular region merge into one another in a continuous fashion.

This also avoids jumps in the optical power and simplifies subsequent processing steps on the base lens element.

In a further configuration of the method according to certain aspects, provision can be made for there to be an application of a further optical element, in particular a shell or a film, which completely covers the Fresnel surface region before the step of curing.

Consequently, the application of a further optical element, for example a shell or a film, may be effectuated here, too, in particular in such a way that it completely covers the Fresnel surface region.

In a further configuration of the method according to certain aspects, provision can be made for there to be direct molding of the adhesive during the step of filling, in particular against a removable shell mold.

Thus, it is possible to use casting methods or other suitable application methods for applying the adhesive. In particular, the adhesive may be applied against a shell mold which then determines the shape of the resultant surface once the shell mold has been removed again after curing.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Embodiments of the invention are shown in the drawing and explained in more detail in the following description. In the figures.

Figure 1:
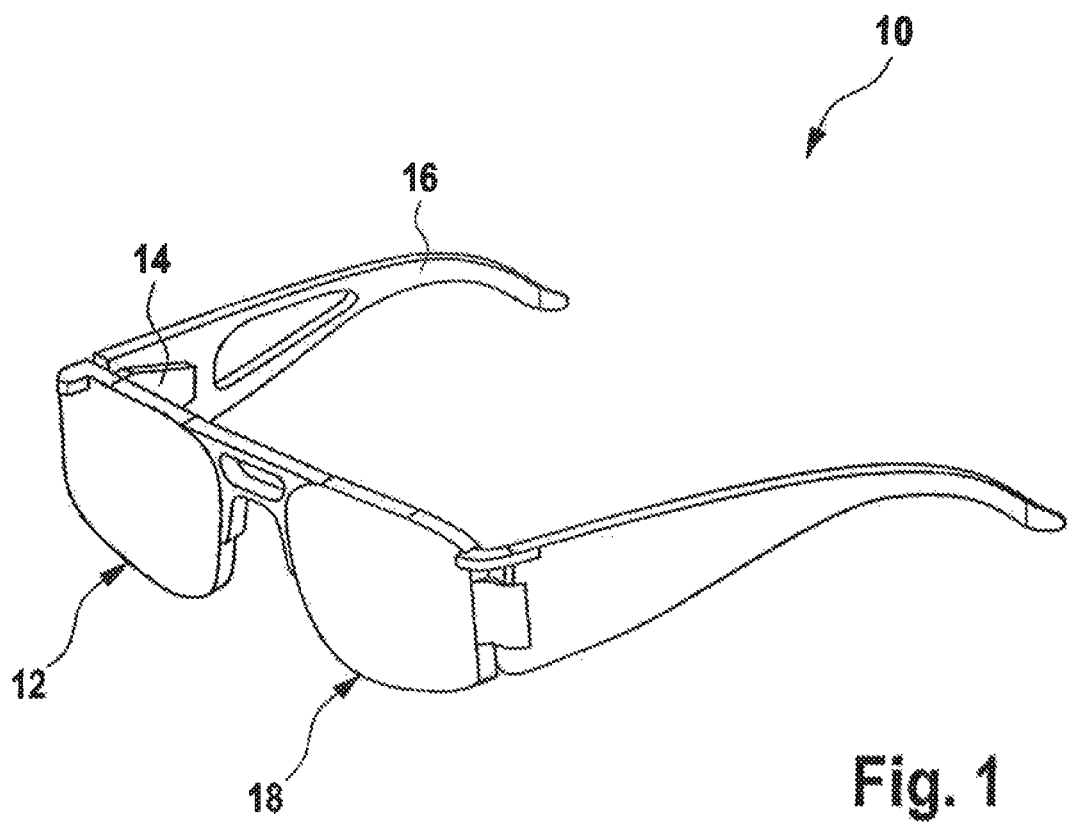
FIG. 1 shows a schematic view of a display apparatus having at least one lens arrangement according to the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 shows spectacles 10, which may also be a display apparatus for displaying images to a wearer of the spectacles.

The spectacles have a lens arrangement 12. This lens arrangement 12 may be a lens arrangement 12 by means of which an image produced by way of an image production device 14 is displayed to a wearer. However, this is not mandatory in all configurations. The lens arrangement 12 may also be a lens arrangement of the spectacles 10 which has no image produced by means of an image production device 14 coupled therein. The lens arrangement 12 is held in a frame 16. Furthermore, a second lens arrangement or spectacle lens arrangement 18 is provided. The lens arrangement or spectacle lens arrangement 18 may be configured with the same features as the lens arrangement 12. However, these may also have different configurations. Thus, both the lens arrangement 12 and the second lens arrangement 18 may be configured for coupling-in an image, produced by means of the image production device 14, to the user. However, provision may also be made for only one or, as already explained above, none of the lens arrangements 12, 18 to be provided for coupling-in an image produced by means of an image production device 14. In principle, the spectacles 10 may also be conventional spectacles without an image production device.

Figure 2:
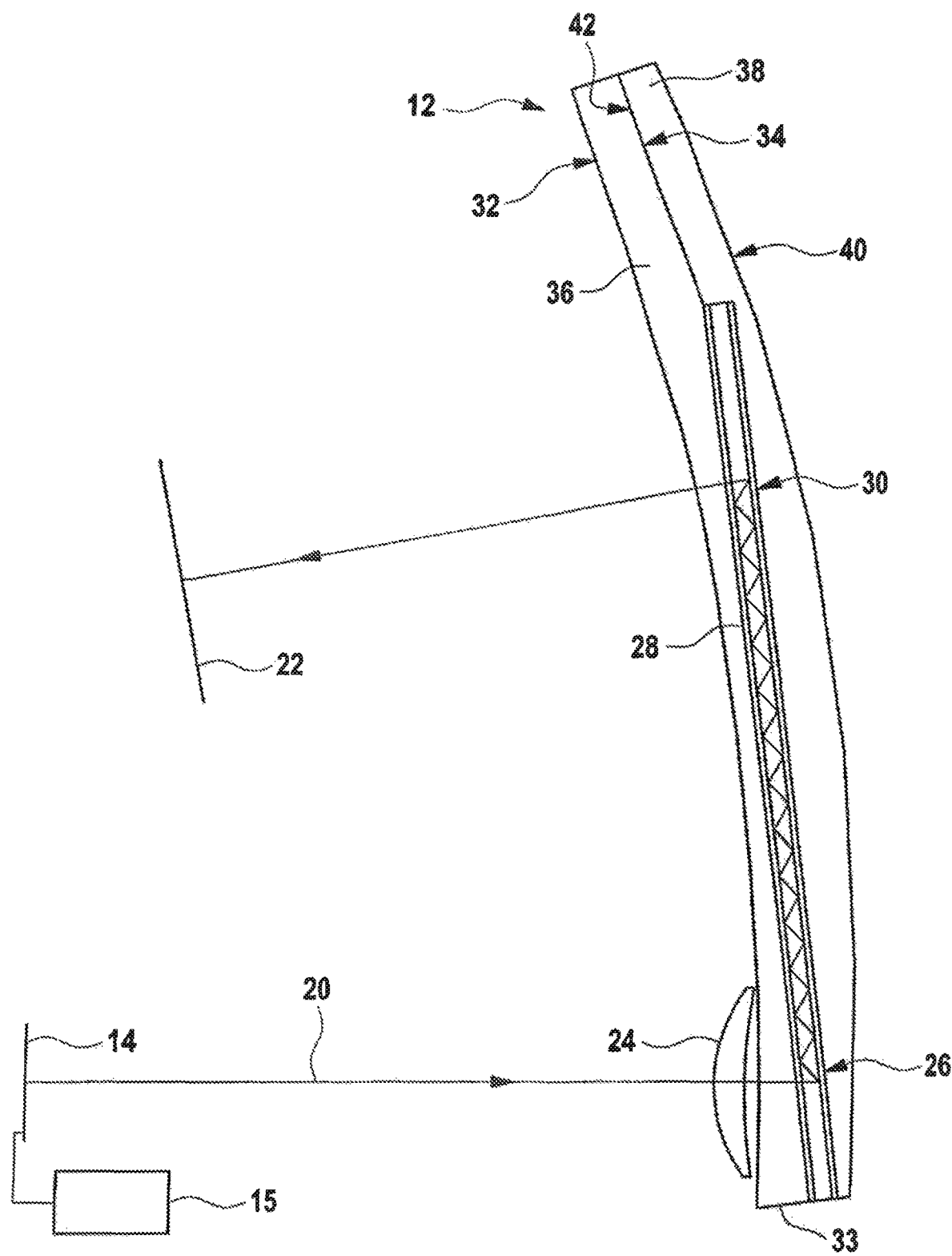
FIG. 2 shows a schematic cross-sectional view of an exemplary configuration of a lens arrangement.

FIG. 2 shows a schematic cross-sectional view of an example of a lens arrangement 12 that is provided for coupling-in an image produced by means of the image production device 14. A control device 15 controls the image production device 14, which transmits an image represented schematically by a beam path 20 to an observer 22. To this end, provision can be made of an input coupling optical unit 24, for example, which couples the produced image into the lens arrangement 12 by means of an input coupling portion 26. The beam path extends within the lens arrangement 12 through a total-internal reflection region 28 and it is output to the wearer and observer of the image 22 by way of an output coupling portion 30. The configuration of the total-internal reflection region 28 as a plane parallel total-internal reflection region 28 is only the representation of a possible example. By way of example, a front surface 32 and a back surface 40 of the lens arrangement 12 may also be used as areas of the total-internal reflection. Consequently, both the front surface 32 and the back surface 40 of the lens arrangement 12 can delimit the total-internal reflection region 28. By way of example, both the input coupling portion 26 and the output coupling portion 30 may be provided by Fresnel surface structures. In principle, it is not mandatory for the input coupling portion 26 and an input coupling optical unit 24 to be provided as illustrated. In principle, the beam path 20 can also be coupled into the total-internal reflection region 28 by way of an edge area 33 of the lens arrangement 12. In this case, there can be a Fresnel surface structure in the output coupling portion 30 only.

The lens arrangement 12 has a base lens element 36. The base lens element 36 is only illustrated schematically in FIG. 2. The base lens element has a back surface 32 facing the observer 22 and a front surface 34 facing away from the observer. Additionally, it has the edge area 33 already specified above. In addition to the base lens element, the lens arrangement 12 may have a further element 38. This further element 38 may be a further lens element; however, it can also be only a film, for example, that should be connected to the base lens element 36. The illustration of this further element 38 is only schematic and not true to scale. The dimensions of the total-internal reflection region 28 also only serve for a schematic explanation. The second element may likewise have a front surface 40 facing away from the user 22 and a back surface 42 facing the user. Consequently, the back surface 42 of the second element 38 is joined onto the front surface 34 of the base lens element 36. However, in principle, the lens arrangement 12 also may have the base lens element 36 only, the front surface 34 of which is provided with a coating, for example.

Figure 3:
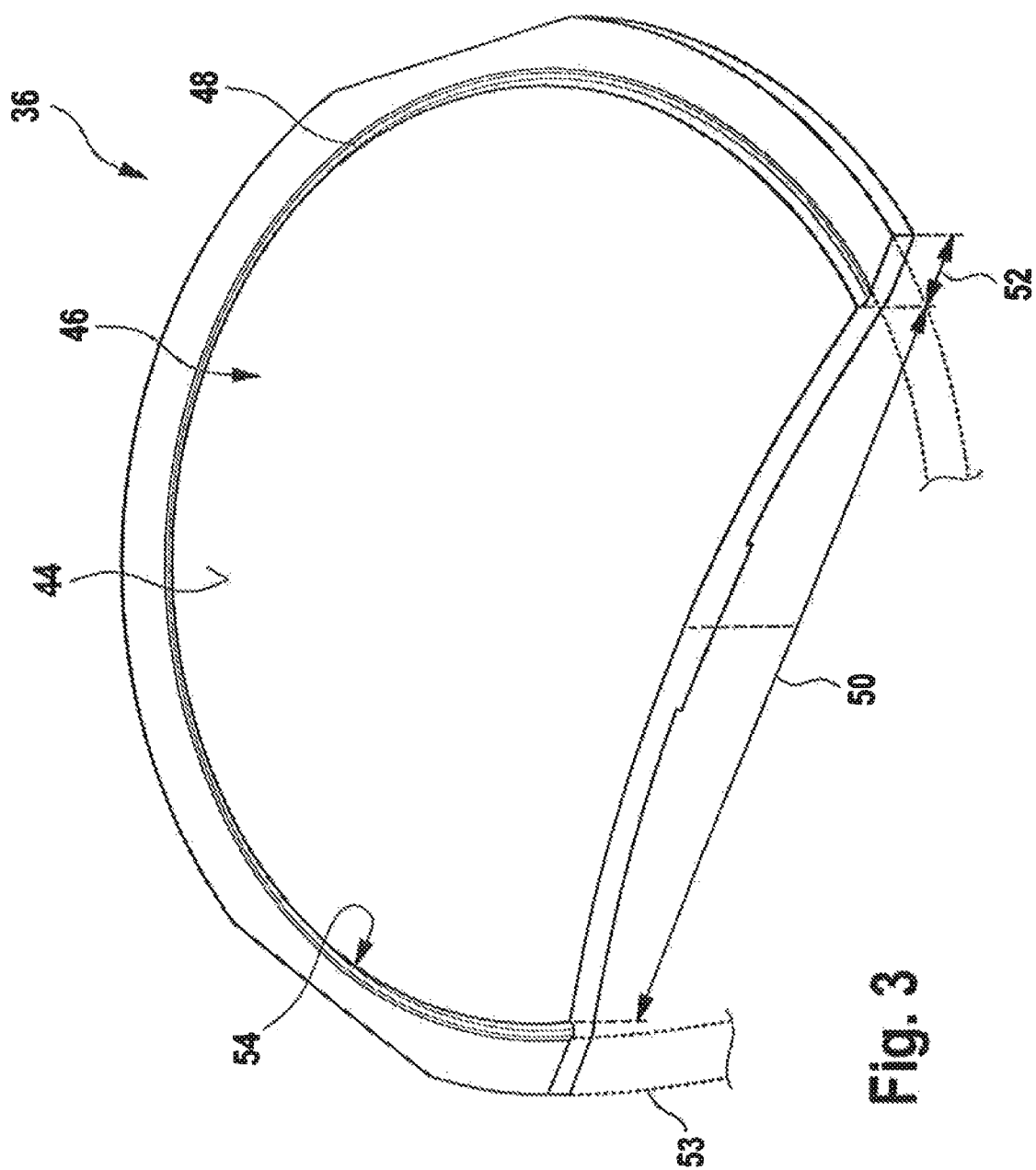
FIG. 3 shows a schematic cross-sectional view of a base lens element of a lens arrangement according to the present invention.

FIG. 3 shows a first embodiment of the base lens element 36.

In the illustrated embodiment, the base lens element 36 has a first surface 44, which is the front surface 34. However, in principle, this may also be the back surface 32. The first surface 44 has an optically effective region 46. A provided or desired optical power is obtained in this optically effective region. In the embodiment illustrated in FIG. 3, the optically effective region is a so-called lenticular region 50. That is to say, it is that region through which the user 22 peers. The lenticular region 50 is encompassed by the edge region 52. The base lens element is attached to the frame 16 by means of the edge region 52. In principle, the edge region 52 may extend around the entire lenticular region 50. However, on account of the cut-off shape of the base lens element illustrated in FIG. 3, the lenticular region 50 may also be open toward one edge of the base lens element 36, like in the example of FIG. 3. The lenticular region 50 is encompassed by an elongate recess 48. Here, a circular circumferential contour 54 arises in a plan view of the base lens element 36, with the circle being open toward the edge in the example illustrated in FIG. 3. The representation of the geometric form of the base lens element 36 should be understood to be merely exemplary. In principle, the base element may also have a circular or oval circumferential contour, as indicated by the dashed lines 53. The same applies to the circumferential contour 54 of the lenticular region 50. As explained below, the elongate recess in this exemplary embodiment may serve, in particular, to simplify the process of joining of a further optical element, in particular a film or a shell, onto the surface 44 by means of adhesive.

Figure 4:
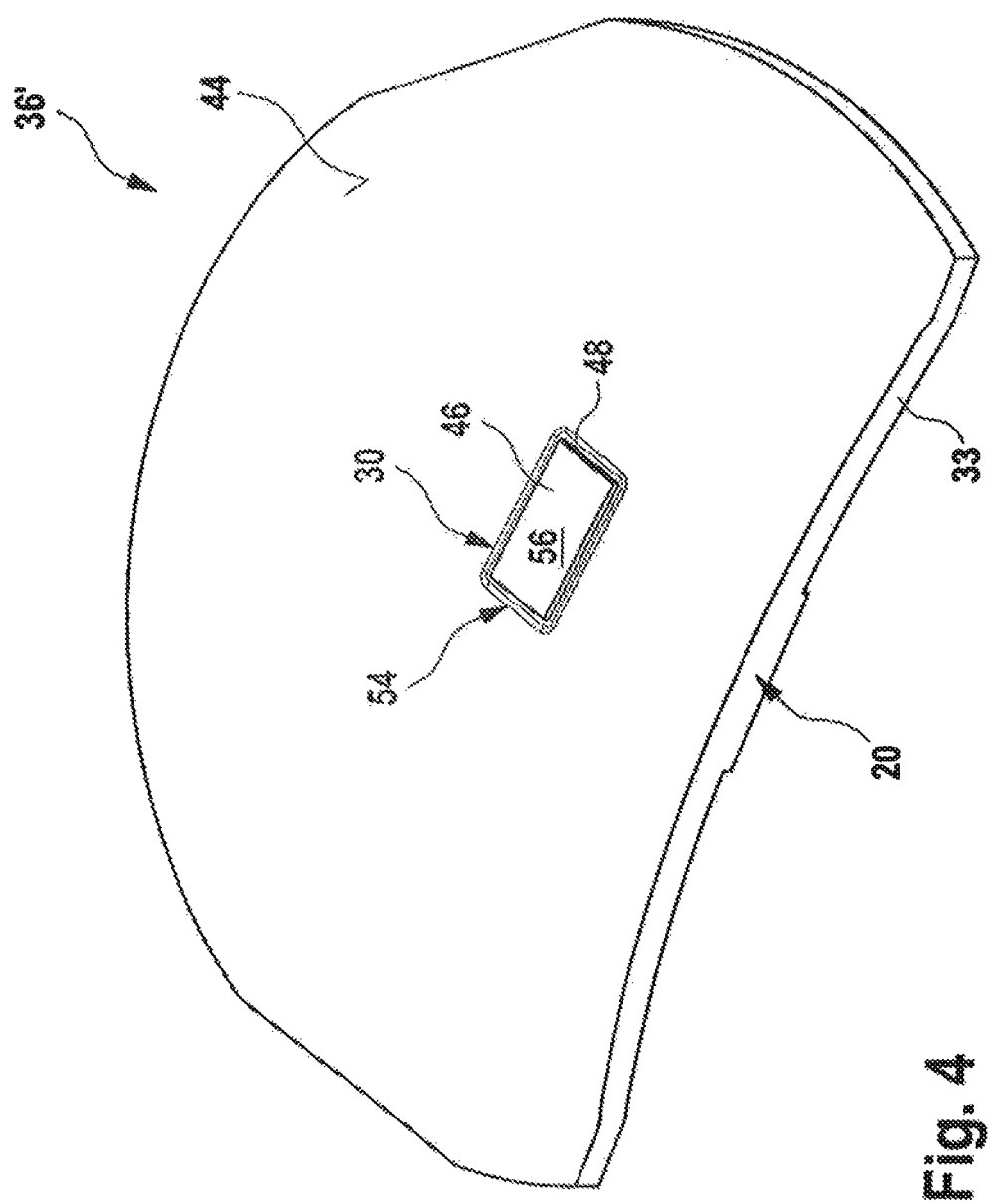
FIG. 4 shows a further configuration of a base lens element.

FIG. 4 illustrates a further embodiment of the base lens element, denoted by 36'. This embodiment may serve, in particular, to improve the provision of a Fresnel surface region 56. By way of example, in this exemplary embodiment, a beam path, as schematically elucidated by way of the beam path 20, may be coupled into the edge area of the base lens element 36 and may be output coupled by means of the Fresnel surface region 56, which serves as an output coupling portion 30. Consequently, the Fresnel surface region 56 forms the optically effective region 46 in this case. In a plan view in the example illustrated in FIG. 4, it has a rectangular circumferential contour 54. However, this should be understood to be merely exemplary. Any other circumferential contour 54 is also conceivable, for example a circular or oval circumferential contour. In the illustrated exemplary embodiment, the rectangular circumferential contour is encompassed in the entirety thereof by the elongate recess 48. However, this need not necessarily be the case; as will still be described below, the elongate recess 48 also may be provided on only one, two or three sides of the rectangular circumferential contour 54. As will still be explained below, the elongate recess may serve here, in particular, to simplify the application of a filler material onto the Fresnel surface region.

Figure 5:
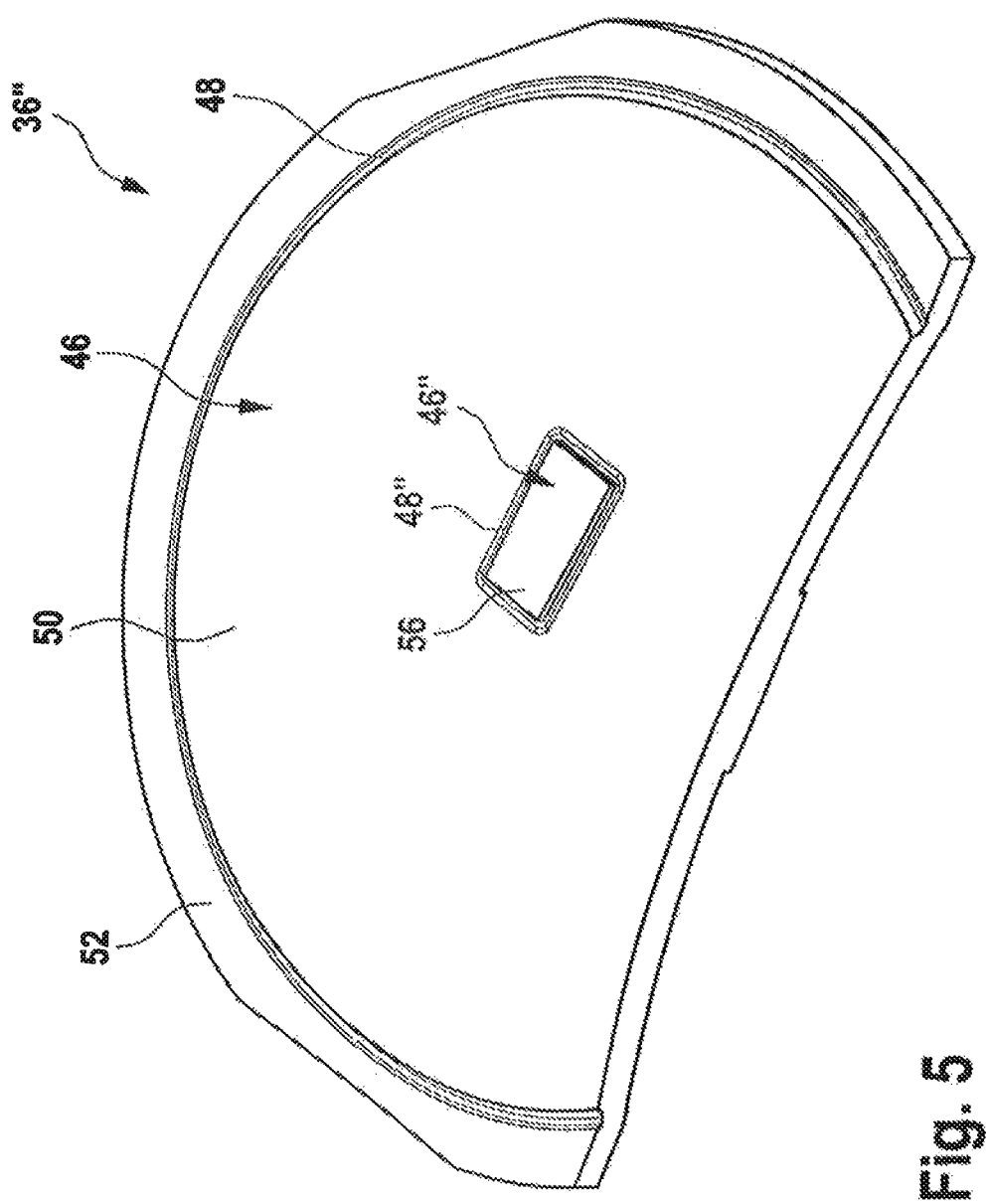
FIG. 5 shows an even further configuration of a base lens element.

FIG. 5 shows a further possible configuration of the base lens element 36. Identical elements are identified by the same reference signs and will not be explained again. In this exemplary embodiment, provision is made, cumulatively, of both an elongate recess 48 and an elongate recess 48". Consequently, the base lens element 36" has two optically effective regions 46 and 46" in this configuration. Additionally, a Fresnel surface region 56 is provided in the lenticular region 50. The lenticular region 50 is encompassed by an elongate recess 48, as is the Fresnel region 56, which is encompassed by the elongate recess 48". Particularly in the case of this embodiment, the elongate recesses 48 and 48" can initially simplify the application of a filler material onto the Fresnel surface region 56 and can then simplify the subsequent process of joining a film on to the lenticular region 50 and over the Fresnel surface region 56.

Figure 6:
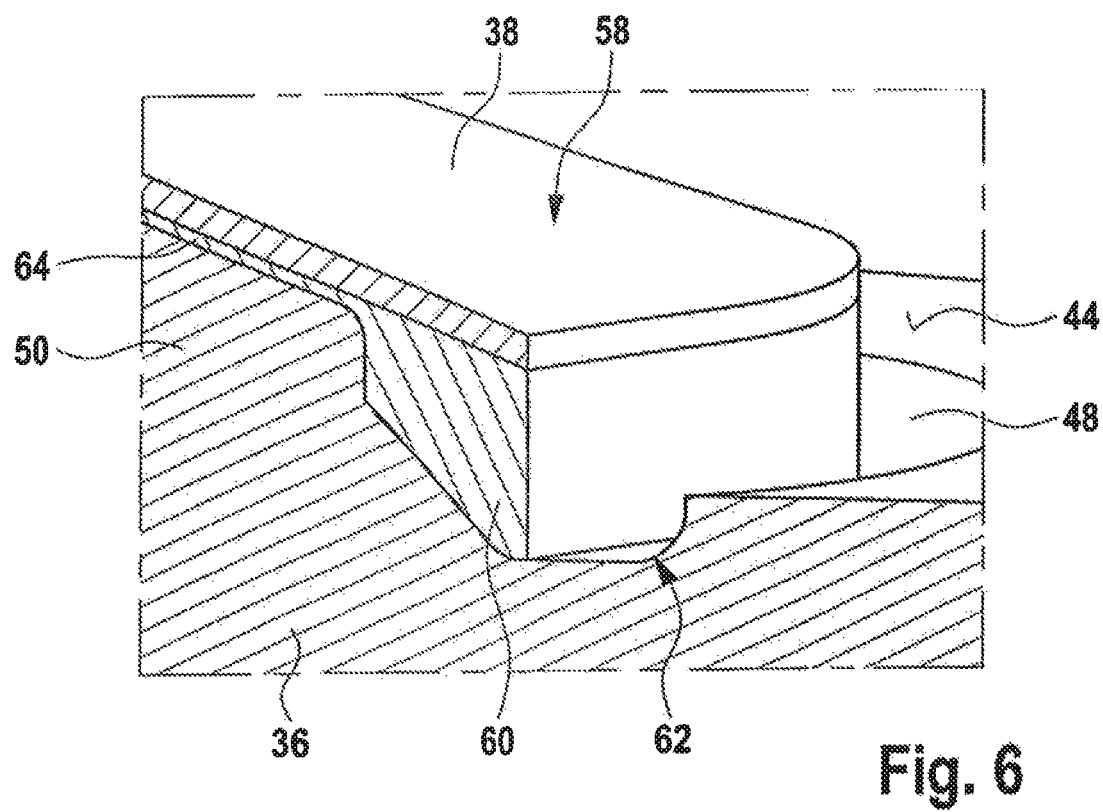
FIG. 6 shows a magnified schematic view of an elongate recess and a film joined onto a base lens element by means of adhesive.

FIG. 6 schematically shows a further optical element 58, which is joined onto a lenticular region 50. By way of example, further optical element 58 may be a film or a shell. In the following examples, the further optical element 58 is a film in only an exemplary manner. FIG. 6 shows a schematic view of the base lens element 36, of the lenticular region 50 and of the elongate recess 48 introduced into the surface 44, said elongate recess at least partly encompassing the lenticular region 50. A film 58 is joined onto the lenticular region 50 by means of an adhesive portion 60. The adhesive portion 60 extends in a gap 64 between the lenticular region 50 and the film 58. Here, the film 58 forms the second element 38 of the lens arrangement 12. In the illustrated view, the adhesive has already cured and extends out of the gap 64 into the elongate recess 48. A cross-sectional profile 62 of the elongate recess 48 is denoted by 62. The cross-sectional profile 62 is constant and does not change over the longitudinal extent of the elongate recess 48. As illustrated, the film 58 may extend beyond the lenticular region 50 in this case and it is supported in the entirety thereof by the adhesive portion 60. As a result of this, applying too large a quantity of adhesive, such that the latter emerges from the gap 64, is uncritical. The adhesive may drain into the elongate recess 48 and consequently support the film 58 over the entire area thereof.

Figure 7:
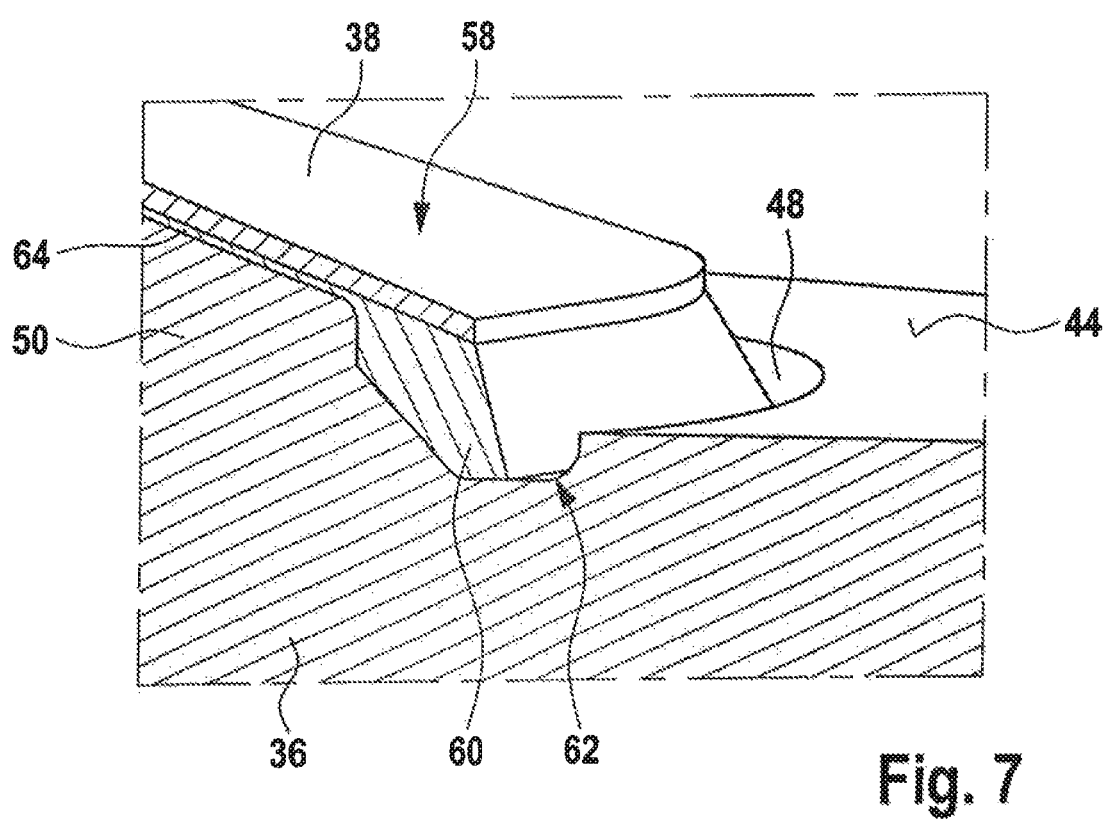
FIG. 7 shows a further exemplary configuration of a film joined onto a base lens element by means of an adhesive portion.

FIG. 7 shows a configuration in which, compared to FIG. 6, a greater quantity of adhesive has been introduced into the gap 64. Consequently, the adhesive portion 60 extends further into the elongate recess 48. However, there is no contamination of the surface 44 since the adhesive is able to flow into the elongate recess 48 during application and able to distribute uniformly in the longitudinal direction of the elongate recess 48 as well. Consequently, the uniform application of the adhesive is substantially simplified. Consequently, in the ultimately joined state, this results in the film 58 being supported uniformly by the adhesive portion 60 over the entire area thereof.

Figure 8:
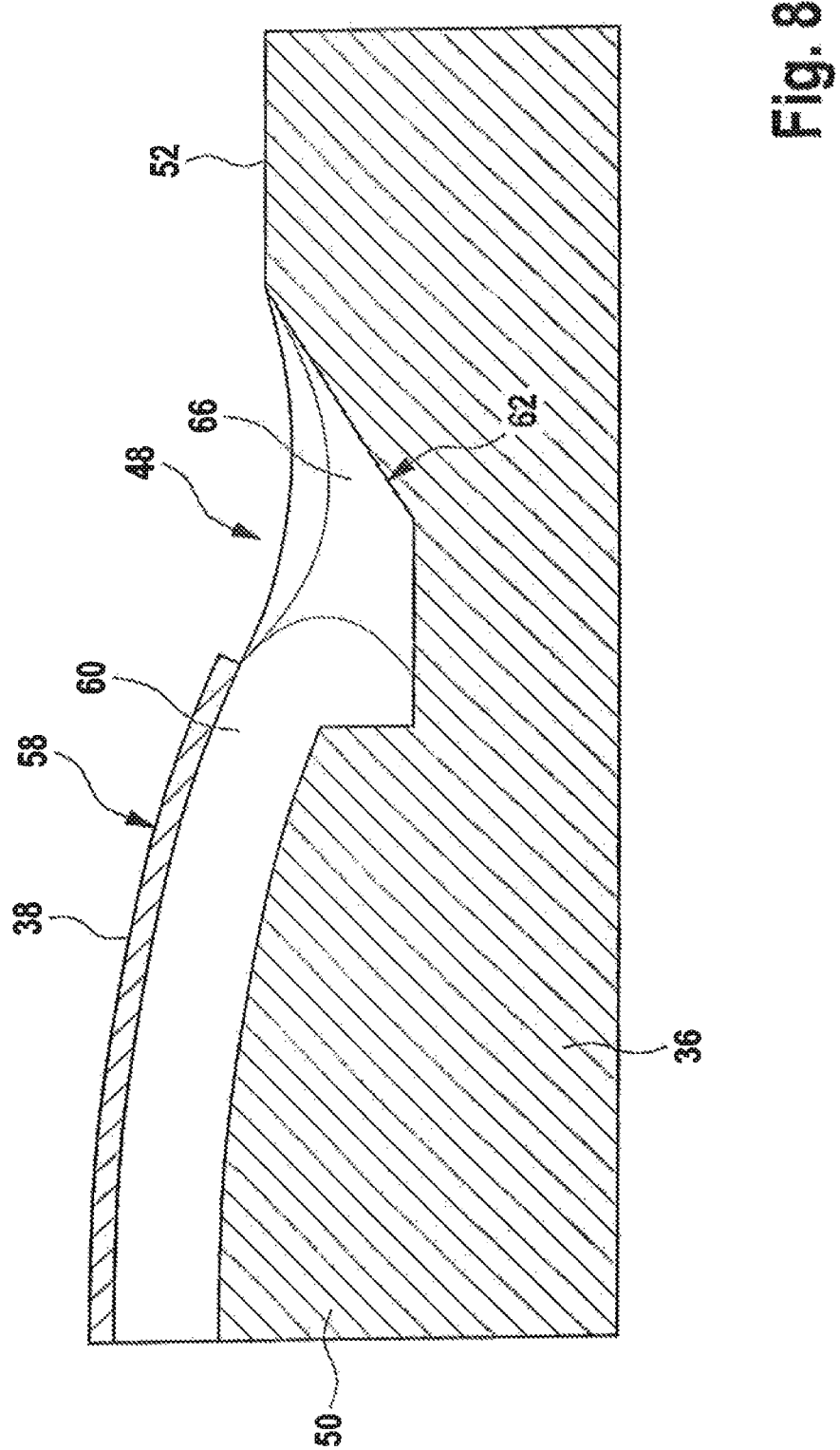
FIG. 8 shows a schematic cross-sectional view of a cross-sectional profile of an elongate recess and a film joined thereon.

FIG. 8 shows a further cross-sectional view of the cross-sectional profile 62 of the elongate recess 48. In this configuration, the adhesive portion 60 fills the entire elongate recess 48. In principle, provision can be made for an additional of adhesive to be applied into the elongate recess 48 after joining the film 58 onto the base lens element 36 in order to deliberately completely fill said elongate recess. This may be advantageous for process steps being effectuated after joining, in particular when using further fluids. Then, these can no longer collect in the only partly filled elongate recesses. Therefore, the elongate recess 48 may be filled with adhesive after joining the film such that there is a continuous transition or transition with a very large radius from the film 58 into the edge region 52, as illustrated in FIG. 8. Furthermore, the reservoir of adhesive in the elongate recess formed thus is able to prevent air from entering the joining gap in the case of a retreat of the adhesive, for example as a consequence of shrinkage or thermal expansion. Thus, the excess applied adhesive may form a compensation reservoir.

Figure 11:
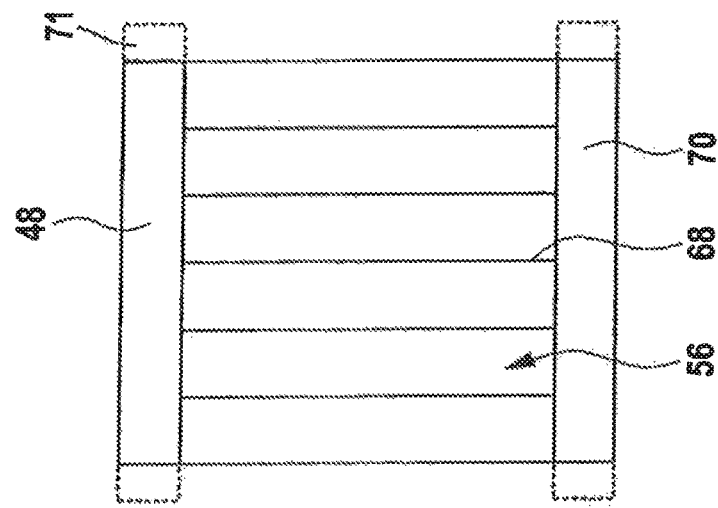
FIGS. 9-11 show schematic plan views of a Fresnel surface region.
Figure 10:
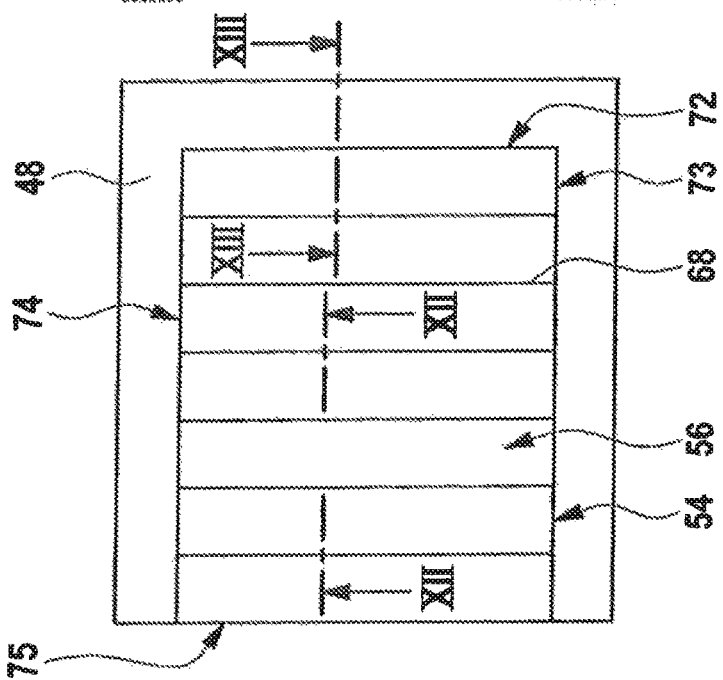
Figure 9:
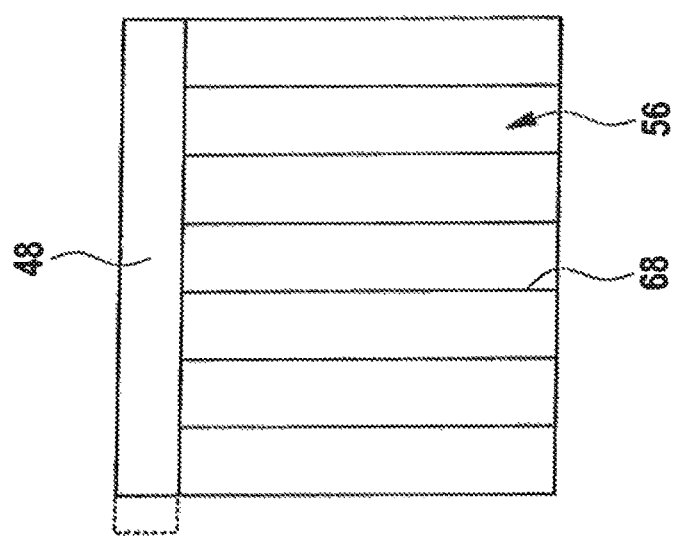

FIGS. 9 to 11 show further configuration options for using an elongate recess 48, in conjunction with a Fresnel surface region in the illustrated exemplary embodiment. FIGS. 9 to 11 schematically show the alignments of Fresnel flank regions 68. As can be identified, the elongate recess 48 need not completely encompass the Fresnel surface region. Initially, all that is important is that the Fresnel flank regions 68, or the depressions or incision regions arranged between the Fresnel flank regions, are connected by means of the elongate recess 48. Therefore, it may be sufficient for the elongate recess 48 to extend only on one side of the Fresnel surface region 56 in a manner substantially perpendicular to the Fresnel flank regions 68 and connect the incision regions. As may be gathered from FIG. 11, a further second elongate recess 70 may also be provided in addition to the elongate recess 48, said further second elongate recess not being connected to the elongate recess 48. The two elongate recesses 48 and 70 may then be arranged opposite one another in respect of the Fresnel surface region 56. The elongate recess 48 and/or the elongate recess 70 may go beyond the Fresnel surface region 56, as shown by the dashed regions 71. This can improve the escape of air.

However, in particular, elongate recesses 48 may be embodied adjacent to three sides of the Fresnel surface region 56. In the plan view illustrated in FIGS. 9 to 11, the circumferential contour of the Fresnel surface region 56 may be rectangular, in particular. Then, the elongate recess 48 may be provided along three sides of this rectangle, 72, 73, 74. An open side 75 may then serve, for example, to introduce the beam path 20 onto the Fresnel surface region 56 in order to provide the output coupling portion 30. Consequently, it is possible by means of the embodiment illustrated in FIG. 10 to connect the open ends of the Fresnel flank regions 68 on both sides and thus significantly simplify a filling of the Fresnel surface region 56 with a filler material.

Figure 12:
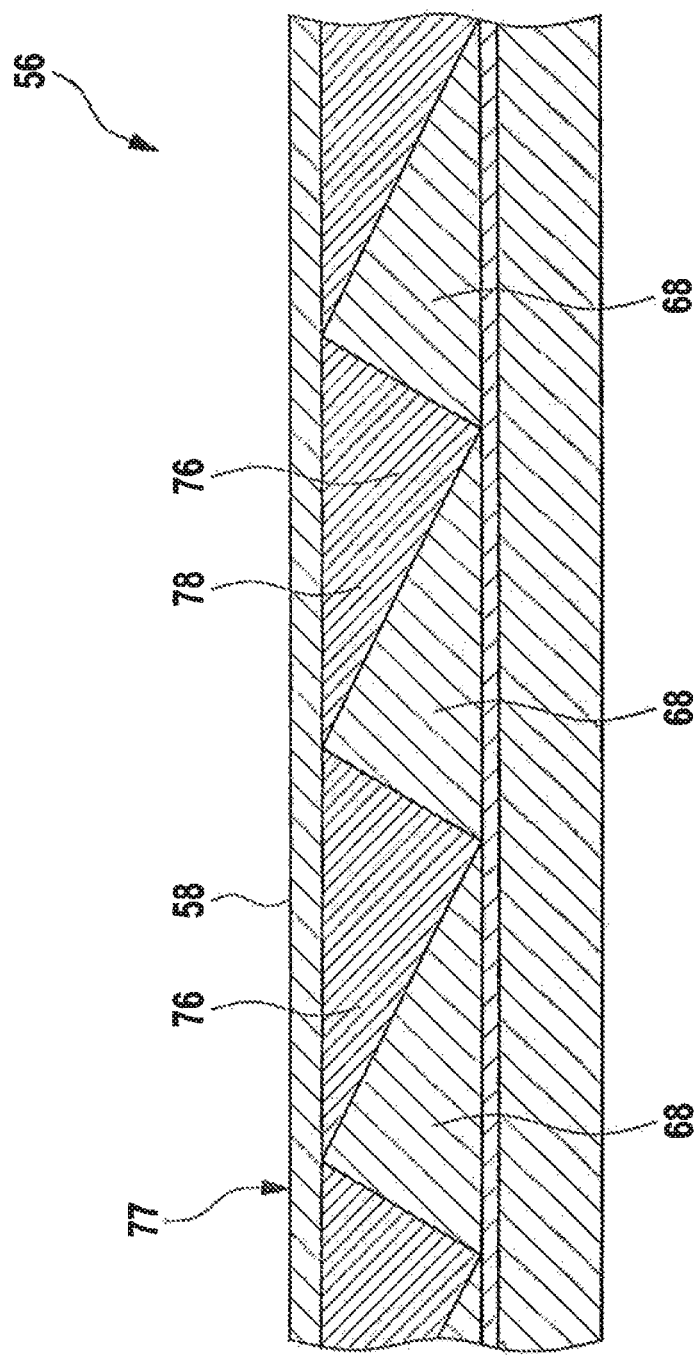
FIG. 12 shows a schematic cross-sectional view along the line XII-XII in FIG. 10.

FIG. 12 shows a schematic cross sectional view of the Fresnel surface region 56 along the line XII-XII. The Fresnel flank regions are illustrated in a cross section and denoted by the reference sign 68. If such surface regions are formed from one material, incision regions 76 consequently arise between the Fresnel flank regions 68. The incision regions 76 should be filled in order once again to provide a smooth surface which facilitates the application of a film 58, for example. It is a further aspect that the incision regions 76 cannot be filled with air as this has a refractive index that differs from the Fresnel flank regions 68. This would yield unwanted media transitions in the lens arrangement 12, which would make the optical design more difficult. Therefore, provision can be made for the incision regions 76 to be filled with a filler material which has an identical refractive index to that of the Fresnel flank regions 68. Then, the Fresnel flank regions 68 may be coated, for example, in order to provide desired reflective properties. However, they can also have an uncoated embodiment. In principle, it is moreover also possible, in a targeted manner, to provide the filler material with a different refractive index to that of the Fresnel flank regions 68 in order to produce corresponding reflective properties at the media transition, obtained thus, between the Fresnel flank regions 68 and the incision regions 76.

However, air inclusions may possibly form when filling the incision regions 76 with the filler material, in particular at a start and at an end. Moreover, it is relatively cumbersome and difficult to individually fill each incision region. Therefore, connecting the incision regions by means of the elongate recess 48 facilitates the avoidance of all air inclusions by virtue of the air being pressed out laterally from the incision regions 76 at the sides 73 or 74. Also, excessive applied filler material may be compensated by way of the elongate recesses 48 between the individual incision regions.

Figure 13:
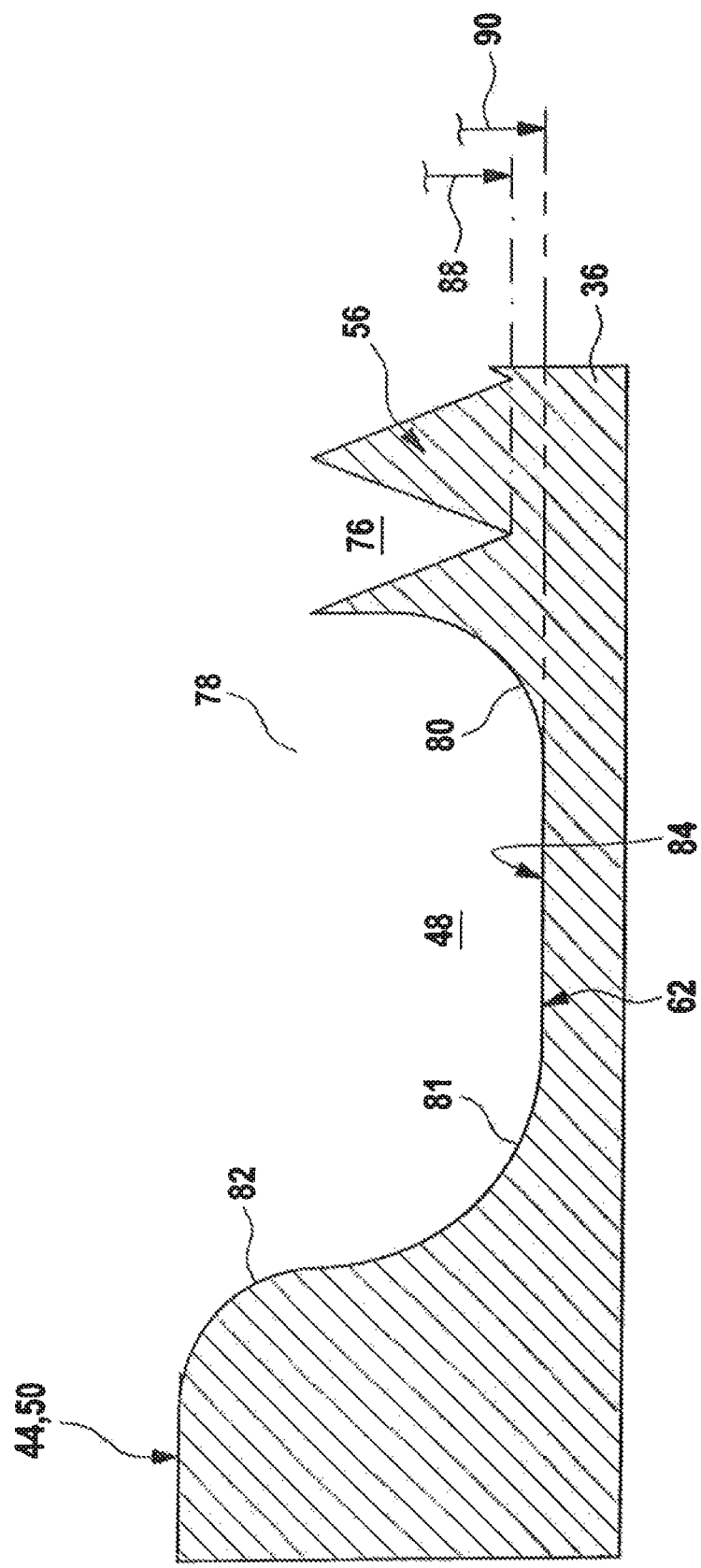
FIG. 13 shows a schematic cross-sectional view along the line XIII-XIII in FIG. 10.

FIG. 13 shows a possible cross-sectional profile for an elongate recess between a Fresnel surface region 56 and a lenticular region 50. The incision regions 76 have a depth 88. The elongate recess 48 has a depth 90. The level from which these depths 88, 90 are measured is, strictly speaking, irrelevant. This may be effectuated from the level of the first surface 44 or else from a tip of the Fresnel flank regions 68. The elongate recess 48 may extend deeper into the base lens element 36 than the incision regions 76, or else it may extend to the same level. This ensures that no air inclusions can form at the base of the incision regions 76 since a groove base 74 of the elongate recess 48 lies deeper. Furthermore, the elongate recess 48 or the cross-sectional profile 62 thereof is preferably embodied with radii 80, 81, 82 so as not to form any sharp corners where possible as air inclusions could inturn form at said sharp corners by virtue of the flow behavior of the filler material or adhesive preventing wetting over the whole area thereof. By way of example, provision can be made for a radius of the radii 80, 81, 82 to be embodied 0.05 mm. If the elongate recess 48 then is filled with the filler material portion 78, this allows a substantially continuous transition to be provided between the Fresnel surface region 56 and the lenticular region 50. In this way, it is also possible to substantially avoid an optical power jump for the observer 22.

Figure 14:
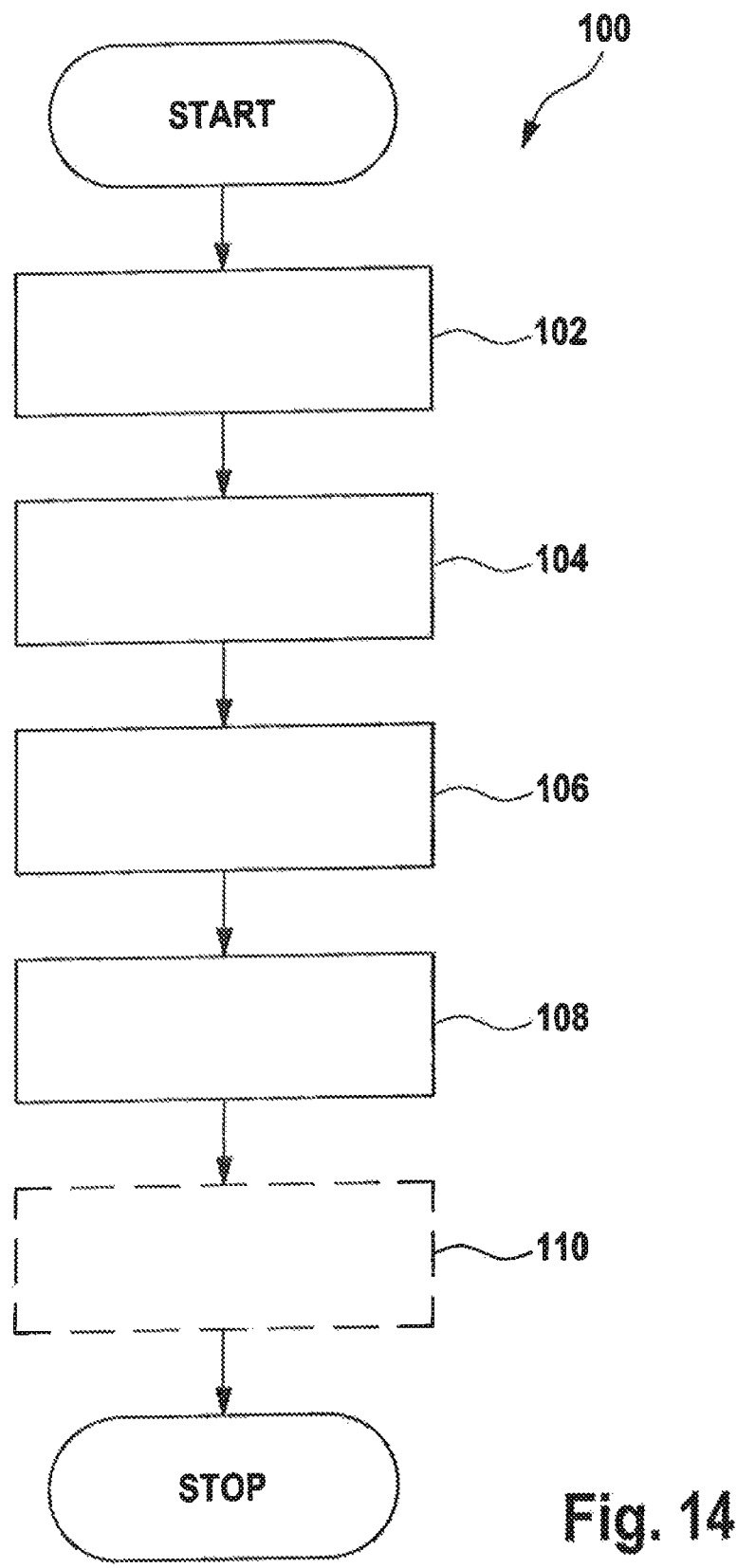
FIG. 14 shows a flowchart of a method.

FIG. 14 shows a schematic flowchart of a method 100 for producing a lens arrangement.

According to a step 102, there initially is the provision of the base lens element 36 with a first surface 44, wherein the first surface 44 has the lenticular region 50 and the elongate recess 48 and wherein the elongate recess 48 at least partly encompasses the lenticular region 50. The elongate recess 48 may extend adjacent to the lenticular region 50. Subsequently, there is the step 104 of applying a liquid adhesive onto the lenticular region 50 such that the adhesive completely covers the lenticular region and extends into the elongate recess and/or of applying the liquid adhesive onto a further optical element 58, in particular a shell or a film, which completely covers the lenticular region.

Then, the further optical element 58 completely covering the lenticular region 50 is applied to the adhesive in a step 106. Then, the adhesive cures in a step 108 such that the joining process is completed.

Optionally, there may furthermore be a step of filling 110 the elongate recess 48 with the adhesive in order to provide a substantially continuous transition between the lenticular region and the edge region 52.

Figure 15:
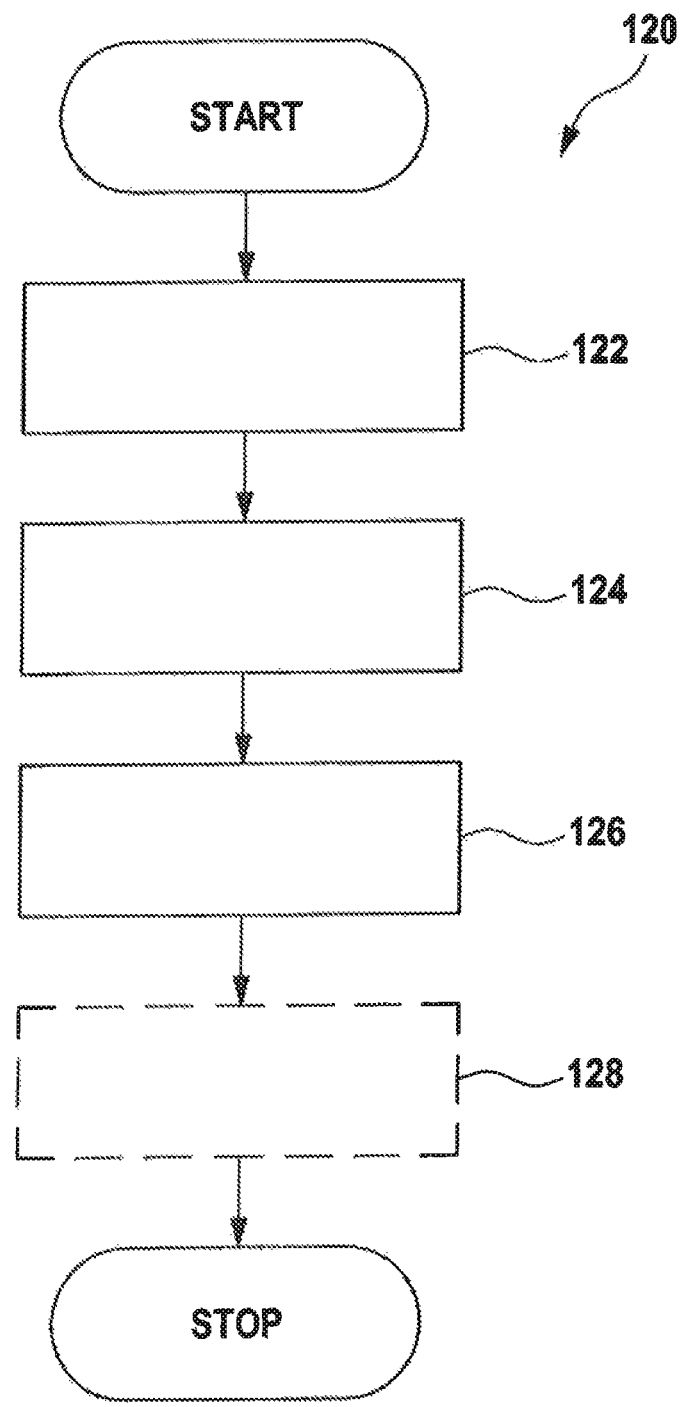
FIG. 15 shows a flowchart of a further method.

FIG. 15 shows a schematic flowchart of a further method for producing a lens arrangement. Initially, there is a step of providing 122 the base lens element 36 with a surface, where the surface has a Fresnel surface region 56 with a Fresnel surface structure 77. For the purposes of providing the Fresnel surface structure 77, the Fresnel surface region 56 has a plurality of Fresnel flank elevations 68 with incision regions 76 lying therebetween. The first surface has an elongate recess 48, wherein the elongate recess 48 extends adjacent to the Fresnel surface structure 77 and connects the incision regions 76 to one another. Here, in particular, the depth 90 of the recess 48 into the surface is greater than the depth 88 of the incision regions 76 into the surface.

Then, the incision regions are filled with a liquid filler material. The filler material may also be an adhesive. The latter acts until the filler material has completely filled the incision regions and moreover extends into the elongate recess. This ensures that all air in the incision regions has been pushed out laterally into the elongate recess. Then, the filler material is cured 126.

Then, there subsequently may still be a step of grinding and/or polishing and/or milling 128 the filler material such that a surface of the filler material and a surface of the lenticular region merge into one another in a continuous fashion. Molding the adhesive against a removable shell mold is also conceivable. In this way, a flat or continuous surface may be provided again. Then, the film or the shell or the further optical element 58, for example, may be applied onto said surface.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. A lens arrangement, comprising:
a base lens element, the base lens element defining a first surface,
wherein the first surface includes a first optically effective region,
wherein the first surface includes an elongate recess, and
wherein the elongate recess at least partly encompasses the first optically effective region.

2. The lens arrangement as claimed in claim 1, wherein the elongate recess extends adjacent to the first optically effective region.

3. The lens arrangement as claimed in claim 1, wherein the base lens element includes a front surface, a back surface, and an edge area, wherein the first surface is the front surface or the back surface of the base lens element.

4. The lens arrangement as claimed in claim 1, wherein the base lens element has an integral embodiment.

5. The lens arrangement as claimed in claim 1, wherein the elongate recess completely encompasses the optically effective region.

6. The lens arrangement as claimed in claim 1, wherein the elongate recess has a constant cross-sectional profile transversely to its longitudinal extent.

7. The lens arrangement as claimed in claim 1, wherein the elongate recess has a cross-sectional profile that varies along its longitudinal extent transversely to the longitudinal extent.

8. The lens arrangement as claimed in claim 1, wherein a circumferential contour of the optically effective region is circular.

9. The lens arrangement as claimed in claim 1, wherein a circumferential contour of the optically effective region is rectangular.

10. The lens arrangement as claimed in claim 1, wherein the first optically effective region is a lenticular region of the base lens element.

11. The lens arrangement as claimed in claim 1, wherein the first optically effective region is a Fresnel surface region with a Fresnel surface structure.

12. The lens arrangement as claimed in claim 11, wherein the Fresnel surface region includes a plurality of Fresnel sloped elevations with incision regions lying therebetween, wherein the Fresnel sloped elevations are coated.

13. The lens arrangement as claimed in claim 11, wherein the Fresnel surface region includes a plurality of Fresnel sloped elevations with incision regions lying therebetween, wherein a depth of the elongate recess is greater than a depth of the incision regions or equals a depth of the incision regions.

14. The lens arrangement as claimed in claim 11, wherein the Fresnel surface region is covered by a filler material portion, wherein the filler material portion extends into the elongate recess.

15. The lens arrangement as claimed in claim 14, wherein the base lens element is formed from a base lens material, wherein the filler material portion is formed from a filler material that differs from the base lens material and wherein the refractive index of the base lens material and the refractive index of the filler material are identical at the same reference wavelength.

16. The lens arrangement as claimed in claim 1, wherein a circumferential contour of the first optically effective region is rectangular, wherein the elongate recess encompasses the optically effective region on only three sides of the rectangular circumferential contour.

17. The lens arrangement as claimed in claim 1, wherein the lenticular region is covered by a further optical element, wherein the further optical element is attached to the lenticular region via an adhesive portion and wherein the adhesive portion extends beyond the lenticular region into the elongate recess.

18. The lens arrangement as claimed in claim 17, wherein the adhesive portion completely fills the elongate recess.

19. The lens arrangement as claimed in claim 1, wherein the elongate recess has a cross-sectional profile transversely to its longitudinal extent, wherein a minimum radius of the cross-sectional profile is greater than or equal to 0.05 mm.

20. The lens arrangement as claimed in claim 1, wherein the elongate recess is a first elongate recess, wherein the first surface moreover has a second elongate recess, and wherein the second elongate recess extends adjacent to the first optically effective region, opposite to the first elongate recess.

21. The lens arrangement as claimed in claim 1, wherein a second optically effective region is arranged in the first optically effective region, wherein the first optically effective region is a lenticular region of the base lens element and wherein the second optically effective region is a Fresnel surface region with a Fresnel surface structure, and wherein an elongate recess in each case extends adjoining the second optically effective region and at least partly encompasses the respective optically effective region.

22. The lens arrangement as claimed in claim 21, wherein the Fresnel surface region is covered by a filler material portion, wherein a surface of the filler material portion and a surface of the lenticular region merge into one another in a continuous fashion.

23. The lens arrangement as claimed in claim 22, wherein the lenticular region is covered by a further optical element, wherein the further optical element is attached to the lenticular region by means of an adhesive portion.

24. A display apparatus including at least one lens arrangement as claimed in claim 1.

25. The lens arrangement as claimed in claim 1, wherein the elongate recess is adapted to take up an excess adhesive applied to the first optically effective region.

26. A lens arrangement, comprising:
a base lens element, wherein the base lens element defines a surface,
wherein the surface includes a Fresnel surface region with a Fresnel surface structure,
wherein the Fresnel surface region includes a plurality of Fresnel sloped elevations with incision regions lying therebetween for providing the Fresnel surface structure,
wherein the surface includes an elongate recess,
wherein the elongate recess extends adjacent to the Fresnel surface structure and connects the incision regions to one another, and
wherein a depth of the recess into the surface is greater than a depth of the incision regions into the surface.

27. The lens arrangement as claimed in claim 26, wherein, the elongate recess extends adjacent to the Fresnel surface structure and connects the incision regions to one another, such that a level of a filler material or of an adhesive can be compensated over the entire elongate recess and the Fresnel surface region.

28. A method for producing a lens arrangement, comprising:
providing a base lens element with a first surface, wherein the first surface includes a lenticular region and an elongate recess, and wherein the elongate recess at least partly encompasses the lenticular region;

at least one of:
applying a liquid adhesive onto the lenticular region such that the adhesive completely covers the lenticular region and extends into the elongate recess, and
applying the liquid adhesive onto a further optical element which completely covers the lenticular region;

applying the further optical element which completely covers the lenticular region onto the base lens element; and curing the adhesive.

29. The method as claimed in claim 28, further comprising filling the elongate recess with the adhesive following the step of applying the liquid adhesive onto the lenticular region.

30. The method as claimed in claim 28, wherein the elongate recess extends adjacent to the lenticular region.

31. The lens arrangement as claimed in claim 28, wherein the elongate recess is adapted to take up an excess adhesive applied to the first optically effective region.

32. A method for producing a lens arrangement, comprising:
providing a base lens element with a surface, wherein the surface includes a Fresnel surface region with a Fresnel surface structure, wherein the Fresnel surface region includes a plurality of Fresnel sloped elevations with incision regions lying therebetween for providing the Fresnel surface structure, wherein the first surface includes an elongate recess, wherein the elongate recess extends adjacent to the Fresnel surface structure and connects the incision regions to one another;
filling the incision regions with a liquid filler material such that the filler material completely fills the incision regions and extends into the elongate recess; and
curing the filler material.

33. The method as claimed in claim 32, further comprising at least one of grinding, polishing and milling the filler material such that a surface of the filler material and a surface of the lenticular region merge into one another in a continuous fashion.

34. The method as claimed in claim 32, further comprising applying a further optical element which completely covers the Fresnel surface region before the step of curing.

35. The method as claimed in claim 32, further comprising directly molding the adhesive during the step of filling.

36. The method as claimed in claim 32, wherein a depth of the recess into the surface is equal to or greater than a depth of the incision regions into the surface.

37. The lens arrangement as claimed in claim 32, wherein, the elongate recess extends adjacent to the Fresnel surface structure and connects the incision regions to one another, such that a level of a filler material or of an adhesive can be compensated over the entire elongate recess and the Fresnel surface region.

* * * * *